United States Patent [19]
Allemann

[11] 3,891,956
[45] June 24, 1975

[54] APPARATUS FOR MEASURING VARIABLES

[75] Inventor: James G. Allemann, Santa Ana, Calif.

[73] Assignee: Aerojet-General Corporation, El Monte, Calif.

[22] Filed: Nov. 19, 1973

[21] Appl. No.: 417,338

[52] U.S. Cl. ............... 337/1; 73/345; 337/417; 340/227.1
[51] Int. Cl. ............................................. H01h 37/10
[58] Field of Search ............ 337/37, 38, 39, 40, 41, 337/42, 1, 2, 3, 417; 340/57, 227.1, 229; 73/345

[56] References Cited
UNITED STATES PATENTS

| | | | |
|---|---|---|---|
| 1,824,372 | 9/1931 | Schlaich | 73/345 |
| 2,273,540 | 2/1942 | Smith | 73/345 |
| 3,161,740 | 12/1964 | Schniers et al. | 340/227.1 |
| 3,209,595 | 10/1965 | Harland | 73/345 |
| 3,302,460 | 2/1967 | Hennecke et al. | 73/345 |

*Primary Examiner*—Harold Broome
*Attorney, Agent, or Firm*—Edward O. Ansell

[57] ABSTRACT

An apparatus for measuring two variables expresses one of the variables in terms of a first change of position, and the other variable in terms of a second change of position, derives from the first and second changes of positions a measurement of the two variables, and combines a third change of position with the first change of position to modify the operation of the measurement function. Such apparatus can be used, for example, to determine the state of a fluid by measuring two variable characteristics thereof, such as pressure and temperature.

17 Claims, 4 Drawing Figures

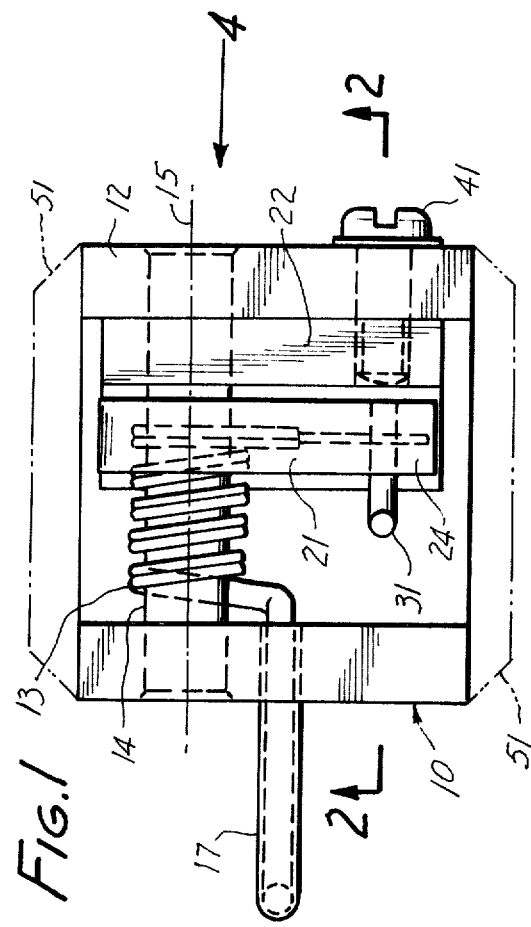
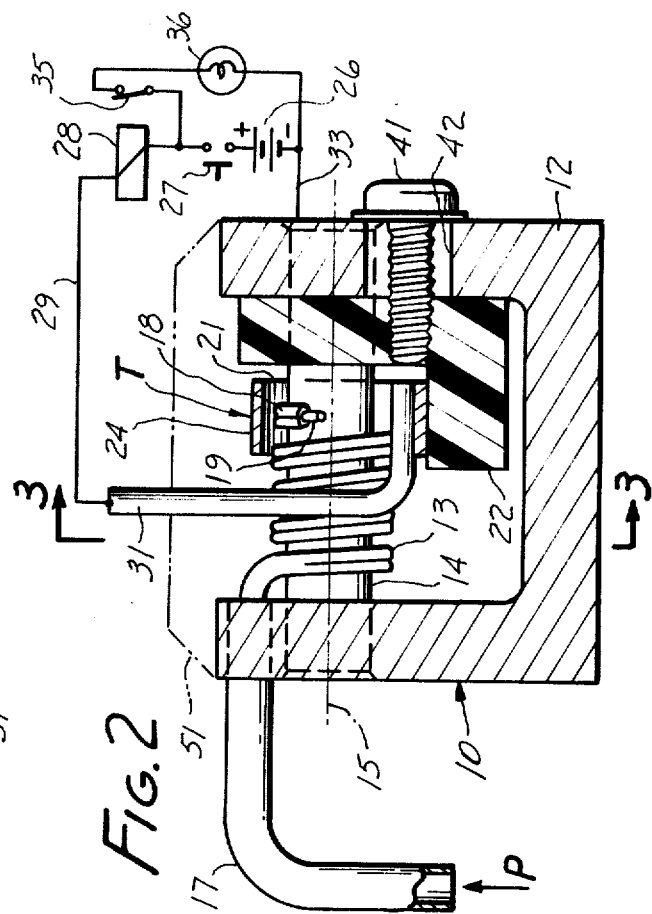
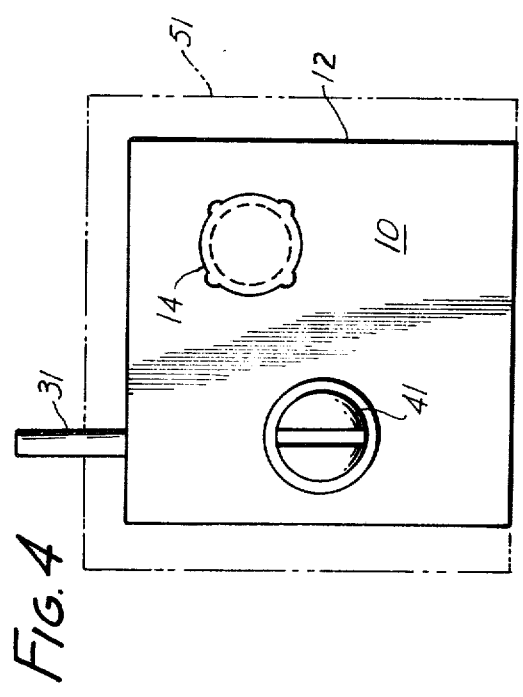
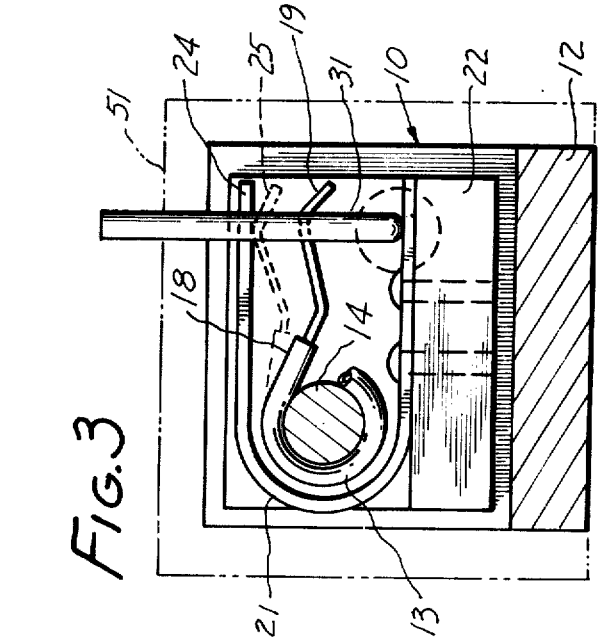

APPARATUS FOR MEASURING VARIABLES

BACKGROUND OF THE INVENTION

1. Field of the Invention

The subject invention relates to apparatus for measuring variables. By way of example, the subject invention may be employed in apparatus for measuring —determining whether the mass of a confined fluid is above or below a predetermined mass threshold.

2. Description of the Prior Art

Existing apparatus for measuring at least two variables suffer the disadvantage that need adjustments are either non-existent or then are expensive to implement, relatively complex, inadequate or unreliable.

In a similar vein, previously proposed apparatus for measuring the quantity of a fluid by the measurement of such parameters as fluid pressure and temperature, suffer the disadvantage of a lack of an adequate treshold adjustment for the pressure and temperature measurements.

In practice, these deficiencies have serious consequences, especially if the pressurized fluid is to be employed in the inflation of safety equipment such as life rafts, life jackets and crash restraint systems, in emergency situations.

SUMMARY OF THE INVENTION

The subject invention overcomes the above mentioned disadvantages.

From one aspect thereof, the invention resides in apparatus for measuring two variables and, in particular, resides in the improvement comprising, in combination, first means for expressing one of said variables in terms of a first change of position, second means for expressing the other of said variables in terms of a second change of position, third means for deriving from said first and second changes of position a measurement of said two variables, and fourth means connected to said first means for combining a third change of position with said first change of position to modify the operation of said measurement deriving means.

From another aspect thereof, the invention resides in apparatus for measuring the quantity of a fluid and, more specifically, resides in the improvement comprising, in combination, first means for measuring the pressure of said fluid, second means for at least indirectly measuring the temperature of said fluid, third means for deriving from said pressure and temperature measurements an indication of the quantity of said fluid, and adjustable fourth means for establishing a variable threshold of said pressure and temperature measurements.

From another aspect thereof, the invention resides in apparatus for measuring the quantity of a fluid and, more specifically, resides in the improvement comprising, in combination, first means for measuring the pressure of said fluid, including an expansible pressure sensing tube having an end deflectible by pressure variations, and means for connecting said tube to said fluid, second means for at least indirectly measuring the temperature of said fluid, including a device deflectible by temperature variations, third means for mounting said deflectable pressure sensing tube end in tracking relationship to said deflectible device, fourth means for deriving from said tracking relationship an indication of the quantity of said fluid, and fifth means for establishing a variable threshold of said pressure and temperature measurements, including adjustable means for varying the relative positions of said pressure sensing tube end and deflectible device.

BRIEF DESCRIPTION OF THE DRAWINGS

The invention will become more readily apparent from the following detailed description of preferred embodiments thereof, illustrated by way of example in the accompanying drawings, in which:

FIG. 1 is a top view of a pressure indicating device in accordance with a preferred embodiment of the subject invention;

FIG. 2 is a section taken on the line 2 — 2 in FIG. 1, and includes a circuit diagram of electrical indicating equipment;

FIG. 3 is a section taken on the line 3 — 3 in FIG. 2; and

FIG. 4 is a side view as seen in the direction of the arrow 4 in FIG. 1.

DESCRIPTION OF PREFERRED EMBODIMENTS

The temperature compensated pressure indicating device 10 shown in the drawings has a mounting frame 12 for the various components. The mounting frame 12 may, in turn, be attached to other equipment by any suitable fastening techniques and means (not shown).

As will become more fully apparent in the further course of this disclosure, the device 10 according to the illustrated preferred embodiment of the invention operates on the principle of expressing two variables in terms of changes of position, of deriving a measurement of the two variables from these changes of position, and of combining a further change of position with one of the previously mentioned changes of position to modify the operation of the measurement deriving function.

To this end, the device 10 has a pressure sensing or Bourdon tube 13 coiled about a guide pin 14 and its longitudinal axis 15. The guide pin is crimped to lateral portions of the mounting frame 12, as seen in FIG. 1.

The pressure sensing tube 13 is connected to a pressure pipe 17 which, in turn, is connected to the container (not shown) of the fluid whose pressure is to be indicated. In accordance with the bore aspects of the subject invention, this fulid may be liquid, gaseous or vaporous.

The pressure sensing tube 13 has a free end 18 which changes its position as a function of the pressure P of the applied fluid. An electrical contact 19 in the form of an electrically conductive wire is attached to the free end 18 of the coiled pressure sensing tube. Accordingly, the electrical contact 19 is subjected to changes in its position as a function of applied fluid pressure P.

As is well known, fluids expand and thus increase in pressure as a function of temperature, so that pressure measurements alone are not a reliable indication of the actual mass or quantity of the fluid available at a different temperature than the one at which the pressure measurement is taken. By way of example, gas supplies for automotive crash restraint systems stored at or near the dashboard area are potentially subjected to temperature variation within a range of about -40° to 220°F at which the system is still supposed to function reliably. Contrary to this, it is well possible under actual operating conditions that a pressure measurement alone would indicate the existence of a seemingly adequate gas supply at a temperature of, say, 220°F, even though the actual quantity of gas available at, say, 10°F would be inadequate because of such factors as a previous gas leakage from the container.

To preclude accidents which would arise from such deficiencies, the indicating device 10 has a bimetallic strip 21 which measures the temperature T of the fluid in question.

In the illustrated preferred embodiment, the bimetallic strip 21 effects that temperature measurement indirectly in that it is somewhat spaced from the container of the fluid. In practice, this is adequate as long as the fluid container and the indicating device 10 are located in the same area and are thus subjected to essentially the same temperature.

The bimetallic strip 21 is bent about the same axis 15 around which the temperature sensing tube 13 is coiled. One end portion of the bimetallic strip 21 is riveted to one leg of an essentially L-shaped electrical insulating and mounting block 22. The guide pin 14 extends through an aperture in the other leg of the mounting block 22, thereby pivoting the mounting block for rotary movement about the same axis 15 around which the pressure sensing tube 13 is coiled. The bimetallic strip 21 has a free end 24 which changes its position as a function of the temperature T. The mounting of the electrical contact 19 and of the bimetallic strip 21 in the illustrated preferred embodiment is such that the electrical contact 19 and the bimetallic strip end 21 track each other during temperature variations affecting the pressure of the stored fluid as well as the degree of deflection of the bimetallic strip 21.

Initially, the pressure sensing tube 13 will move the electrical contact 19 from the solidly illustrated position to an actuated position shown in dotted outline at 25 in FIG. 3 when the pipe 17 is connected to the pressurized fluid container.

In that manner, the contact 19 is moved into electrical contact with the bimetallic strip 24. Pressure increases tend to uncoil the sensing tube 13 whereby the electrical contact 19 is moved counterclockwise as seen in FIG. 3. Similarly, temperature increases tend to unbend the bimetallic strip 24 whereby the free end 24 moves in the same direction as the electrical contact 19.

Since the electrical contact 19 and the bimetallic strip end 24 thus track each other, an electrical indicating circuit extending through the contact 19 and bimetallic strip 21 will remain closed irrespective of temperature variations within a predetermined operating range. An electrical indicating circuit of this type is shown in FIG. 2.

In particular, FIG. 2 shows an automotive battery or other electric power supply 26 combined with part of an ignition switch or other main switching device 27. At the intitiation of the systems operation, the switch 27 is closed whereby a relay 28 is electrically energized through a circuit extending from the positive terminal of the battery 26 through the switch 27, relay 28, line 29, electrical terminal 31, bimetallic strip 21 electrically connected to the terminal 31, free strip end 24, electrical contact 19, pressure sensing tube 13, pipe 17 and mounting frame 12, line 33, and negative terminal of the battery 26.

As long as there is sufficient fluid pressure in the container connected to the pressure pipe 17, the contact 19 is in electrically conducting engagement with the free strip end 24.

Accordingly, the relay 28 will be immediately energized to open a normally closed relay contact 35. This instantly interrupts energization of an electric signal lamp 36. In practice, it is possible that the lamp 36 may be very shortly energized from the battery 26 when the main switch 27 is being closed and while the requisite magnetic field builds up in the relay 28. This, however, is no detriment, since it is good practice in the automotive field and in other areas to have a signal lamp light up briefly at the intiation of an operation to indicate that the signal lamp is still intact, rather than being burned out. Nevertheless, the instant opening of the normally closed relay contact 35 will prevent longer energization of the signal lamp 36 as long as mass or quantity of the fluid in the pressurized container remains sufficient at the various operating temperatures.

If the mass or quantity of the pressurized fluid becomes inadequate, the pressure sensing tube 13 will be incapable of maintaining the contact 19 in electrically conducting engagement with the bimetallic strip end 24. Accordingly, there will be a loss of tracking and the contact 19 will separate from the strip end 24, thereby opening the electrical energizing circuit for the relay 28. The relay 28 will thus become deenergized, thereby permitting its normally closed contact 35 to become closed. In consequence, the signal lamp 36 will be energized from the battery 26 as long as the main switch 27 remains closed.

In this manner, a warning light will indicate a loss of adequate fluid and thus an unsafe operation. It will thus be recognized that the exact treshold of tracking loss becomes a very important factor in the operation of the entire system of which the indicator device 10 is a part. To satisfy this safety requirement, the illustrated preferred embodiment permits pivotal movement of the mounting block 22 relative to the axis 15. In this manner, the free end 24 of the bimetallic strip may be moved relative to the contact 19, thereby adjusting the contact pressure as well as the threshold of contact engagement.

Once that treshold has been properly adjusted, the angular positon of the mounting block 22 is fixed by tightening a locking screw 41. The screw 41 extends into an internal thread in the mounting block 22. A metallic insert (not shown) may be employed in the mounting block 22 to provide the requisite internal thread for the locking screw 24.

The locking screw 41 further extends through an elongated slot or oversized hole 42 in the side of the mounting frame 12. This provides the locking screw 41 with sufficient leeway for the desired pivotal movement of the mounting block 22.

In considering the illustrated embodiment, it will be recognized that the mounting block 22 with associated parts permits combination of a third change of position with the inherent change of position of the bimetallic strip 21, to the effect of modifying the operation of the indicating device 10.

Because of the disclosed interrelationship of the pressure sensing tube 13 and bimetallic strip 21, particularly effective and accurate treshold adjustments are possible with the preferred embodiment of the subject invention.

If desired, the internal parts of the indicating device 10 may be protected by a suitable cover, shown only in phantom outline at 51 in the drawings.

Modifications and variations within the spirit and scope of the subject invention will become apparent to those skilled in the art from the subject extensive disclosure.

I claim:

1. In apparatus for determining the state of a fluid by measuring two variable characteristics thereof, the improvement comprising, in combination:

first means for expressing one of said variables in terms of a first change of position;

second means for expressing the other of said variables in terms of a second change of position;

third means operatively associated with said first and second means for deriving from said first and second changes of position an indication of the relative displacement of said first and second changes of position with respect to each other; and fourth means connected to said first means for combining a third change of position with said first change of position to modify the operation of said measurement deriving means.

2. An apparatus as claimed in claim 1, wherein:

said second means include means for tracking said first change of position with said second change of position; and said fourth means include means for adjusting the position of said first means relative to said tracking means.

3. An apparatus as claimed in claim 1, wherein:

said second means include means for tracking said first change of position with said second change of position;

said third means include means for detecting a loss of tracking between said first and second changes of position; and said fourth means include means for adjusting the level of said tracking loss.

4. An apparatus as claimed in claim 1, wherein:

said second means include means for effecting said second change of position essentially relative to a predetermined axis; and said fourth means include means for adjusting the position of said first means relative to said second means and relative to said predetermined axis.

5. An apparatus as claimed in claim 1, wherein:

said second means include means for tracking said first change of position with said second change of position essentially relative to a predetermined axis; and said fourth means include means for adjusting the position of said first means relative to said tracking means and relative to said predetermined axis.

6. In apparatus for determining when the quantity of a confined gas is diminished below a predetermined mass threshold, the improvement comprising, in combination:

first means for measuring the pressure of said gas;

second means for at least indirectly measuring the temperature of said gas;

third means operatively associated with said first and second means for combining said pressure and temperature measurements to derive an indication of whether the quantity of said confined gas exceeds the predetermined mass threshold; and adjustable fourth means operatively associated with said first and second means for establishing a variable threshold of said pressure and temperature measurements.

7. An apparatus as claimed in claim 6, wherein:

said first means include means for expressing variations in the pressure of said gas in terms of a first change of position;

said second means include means for expressing variations of said temperature of said gas in terms of a second change of position;

said third means include means for deriving said indication from the relative displacement of said first and second changes of position with respect to each other; and said fourth means include means for combining a third change of position with one of said first and second changes of position.

8. An apparatus as claimed in claim 7, wherein:

at least one of said first and second means include means for tracking one of said changes of position with the other of said changes of position; and said third means include means for deriving said indication of whether the quantity of said confined gas exceeds the predetermined mass threshold by detecting the maintenance or loss of tracking between said first and second changes of position; and said fourth means include means for adjusting the threshold below which said first and second changes of position will no longer track.

9. An apparatus as claimed in claim 7, wherein:

one of said first and second means includes means for effecting one of said first and second changes of position essentially relative to a predetermined axis; and said fourth means include means for adjusting the position of the other of said first and second means relative to said one means and relative to said predetermined axis.

10. An apparatus as claimed in claim 7, wherein:

at least one of said first and second means include means for tracking one of said changes of position with the other of said changes of position essentially relative to a predetermined axis;

said third means include means for deriving said indication of whether the quantity of said confined gas exceeds the predetermined mass threshold by detecting the maintenance or loss of tracking between said first and second changes of position; and said fourth means include means for adjusting the position of the other of said first and second means relative to said tracking means and relative to said predetermined axis.

11. In apparatus for determining when the quantity of a confined gas is diminished below a predetermined mass threshold, the improvement comprising, in combination:

means for measuring the pressure of said gas, including an expansible pressure sensing tube having an end deflectible by pressure variations, and means for connecting said tube to said quantity of confined gas;

means for at least indirectly measuring the temperature of said gas, including a device deflectible by temperature variations, said deflectible pressure sensing tube end being arranged in tracking relationship with said temperature deflectible device so long as the predetermined mass threshold is exceeded;

means for deriving from said tracking relationship an indication of the relationship of said quantity of confined gas to said predetermined mass threshold; and means for establishing a variable threshold of said pressure and temperature measurements, including adjustable means for varying the relative positions of said pressure sensing tube end and deflectible device.

12. An apparatus as claimed in claim 11, wherein:
said means for deriving an indication from said tracking relationship include an electric contact mounted on said deflectible pressure sensing tube end adapted to contact said deflectible device during the maintenance of said tracking relationship and said adjustable means include means for varying the contact pressure of said electric contact relative to said deflectible device.

13. An apparatus as claimed in claim 11, wherein:
said pressure sensing tube is coiled about a predetermined axis; and said adjustable means include means for varying the relative positions of said pressure sensing tube end and deflectible device relative to said predetermined axis.

14. An apparatus as claimed in claim 11, wherein:
said deflectible device includes a bimetallic temperature sensing strip.

15. An apparatus as claimed in claim 11, wherein:
said deflectible device includes a bimetallic temperature sensing strip; and said adjustable means include means for adjusting the position of said temperature sensing strip.

16. An apparatus as claimed in claim 11, wherein:
said pressure sensing tube is coiled about a predetermined axis;

said deflectible device includes a bimetallic temperature sensing strip bent about said predetermined axis; and said adjustable means include means for adjusting the position of said bent bimetallic strip relative to said predetermined axis.

17. An apparatus as claimed in claim 11, wherein:
said pressure sensing tube is coiled about a predetermined axis;

said deflectible device includes a bimetallic temperature sensing strip bent about said predetermined axis;

said means for deriving an indication from said tracking relationship include an electric contact mounted on said deflectible pressure sensing tube end and adapted to contact a free end portion of said bimetallic strip;

means for mounting said pressure sensing tube with said electric contact in tracking relationship with said free end portion of said bimetallic strip; and said adjustable means include means for effecting rotary movement of said bent bimetallic strip relative to said predetermined axis, and means for locating said bimetallic strip in any of several angular positions.

* * * * *

UNITED STATES PATENT OFFICE
CERTIFICATE OF CORRECTION

PATENT NO. : 3,891,956
DATED : June 24, 1975
INVENTOR(S) : James G. Allemann

It is certified that error appears in the above-identified patent and that said Letters Patent are hereby corrected as shown below:

Column 1, line 12, delete "need" and insert --needed-- line 13, delete "then" and insert --they-- lines 18 and 19, delete "treshold" and insert --threshold-- line 64, delete "deflectable" and insert --deflectible--

Column 2, line 44, delete "bore" and insert --broad-- line 45, delete "fulid" and insert --fluid--

Column 4, line 32, delete "treshold" and insert --threshold-- line 41, delete "treshold" and insert --threshold-- line 62, delete "treshold" and insert --threshold--

Signed and Sealed this second Day of March 1976

[SEAL]

Attest:

RUTH C. MASON
*Attesting Officer*

C. MARSHALL DANN
*Commissioner of Patents and Trademarks*